R. DAVIS.

Fruit Jar.

No. 1,432. Reissued Mar. 17, 1863.

Witnesses:

Charles E. Foster.

W. Albert Steel.

Inventor:

Henry Howson

Atty for the assignees.

UNITED STATES PATENT OFFICE.

THOS. R HARTELL AND JNO. LETCHWORTH, OF PHILADELPHIA, PENNSYLVANIA, ASSIGNEES, BY MESNE ASSIGNMENTS, OF RHODA DAVIS.

IMPROVED ELASTIC CAP FOR SEALING CANS AND BOTTLES.

Specification forming part of Letters Patent No. 16,684, dated February 24, 1857; Reissue No. 1,432, dated March 17, 1863.

*To all whom it may concern:*

Be it known that we, THOMAS R. HARTELL and JOHN LETCHWORTH, both of Philadelphia, Pennsylvania, have become the sole owners of certain Letters Patent for Improved Elastic Caps for Sealing Cans and Bottles, granted to the late RHODA DAVIS, of Brookhaven, New York, on the 24th day of February, A. D. 1857; that we deem the said Letters Patent inoperative and invalid by reason of a defective and insufficient specification; and we do hereby declare that the following is a full, clear, and exact description of the said invention, reference being had to the accompanying drawings, and to the letters of reference marked thereon.

The invention of the said RHODA DAVIS consists of a rigid plate, of metal or other suitable material, having a web or band of gum-elastic so formed and arranged that when applied to a jar, bottle, or other tubular object the web or band will be stretched, and, tending to return to its original form and dimensions, will effect a perfectly tight joint, as described hereinafter.

In order to enable others to make and apply this invention, we will now proceed to describe its construction and operation.

Figure 2:
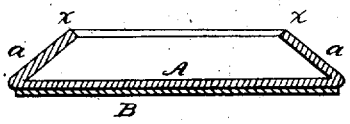
Figure 1:
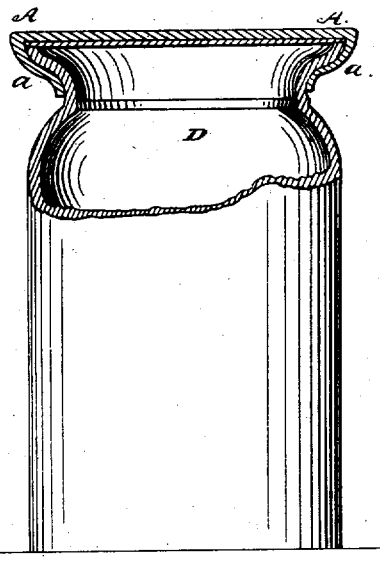
Figure 4:
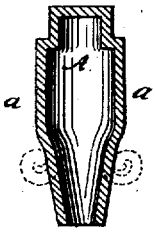
Figure 3:
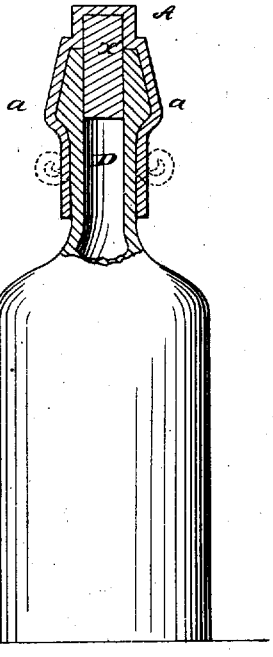

On reference to the accompanying drawings, which form a part of this specification, Figure 1 is a sectional view of the elastic cover as applied to a jar; Fig. 2, a section of the cover as it appears prior to its application to the jar; Fig. 3, a section of the cover as applied to a bottle, and Fig. 4 a view of the cover detached from the bottle.

Similar letters refer to similar parts throughout the several views.

On reference to Figs. 1 and 2, A represents the elastic cover, which in the present instance consists of a disk of gum-elastic with an annular flange or web, *a*, of the same material on the edge of and forming a part of the said disk.

B is a circular plate, of metal, pasteboard, wood, or other rigid material, which may either be placed loosely on the edge of the vessel's mouth prior to the application of the cover thereto, or it may be so secured to the cover as to form a part of the same. When detached from the vessel D, but arranged for application to the same, the flange or web *a* is turned up from the position seen in Fig. 1; or, in other words, is turned inside out, so as to assume the form and position represented in Fig. 2, the plate B being on the outside of the cover, whereas in Fig. 1 it is in the inside. The cover, as seen in Fig. 2, is less in diameter than that to which it is expanded when applied to the vessel—that is to say, the web or flange *a* is inclined to such an angle that its diameter at the point *x* is less than that of the vessel at the point which coincides with the edge of the flange when the latter is fitted to the vessel.

In applying the cover it is first deposited with the plate B down on the edge of the vessel's mouth. The flange *a* is then turned down (which can be readily done, owing to its elasticity) so as to assume the form and position illustrated in Fig. 1. As the flange *a* has a constant tendency to recover its former contracted dimensions and the former inclined position, seen in Fig. 2, it is evident that the vessel must be grasped by the flange with a contractile force determined by the thickness of the gum-elastic flange and the difference between the form and dimensions of the flange when attached to and detached from the vessel. A perfectly air-tight joint is thus effected between the flange and the vessel by the inherent contractile force of the said flange.

In Fig. 3 the cover A is modified in form for application to the neck of a bottle, D, containing a cork, *x'*. In this instance, as in that last referred to, the cover is less in diameter when removed from than when applied to the bottle, the form of the cover when detached being that or approximating to that shown in Fig. 4, so that reliance is placed entirely on the contractile force of the web *a* of the cover to produce a tight joint, the cork *x'* taking the place of the plate B, Figs. 1 and 2.

In order to apply this cover to the bottle, the web *a* is coiled up, as shown by red lines; or, in other words, is turned inside out, after which the cover can be easily pushed over the bottle and the web afterward uncoiled, so that it can grasp the neck of the bottle with the desired contractile force.

It will be readily seen that the covers with their elastic webs or flanges can be adapted to vessels, jars, and other like tubular objects which it is desirable to hermetically seal; that the cover can be applied to vessels of different forms without any considerable change in the form of the cover from that represented in Fig. 2, for the inclined web or flange *a* would readily adjust itself to a vessel of any form, providing the portion of the vessel which the web has to grasp be of diameter sufficient to expand the web, and thereby endow it with the desired contractile force. It will also be seen that the cover can be used without the plate B, as seen in Fig. 3, or with the plate, as seen in Figs. 1 and 2; that the plate may be attached to the cover or may be detached from the same, and that an inclined elastic flange, web, or band may be so combined with and connected to a rigid plate that there is no necessity for the gum-elastic to extend entirely across the plate.

We claim as the invention of the aforesaid RHODA DAVIS—

A rigid plate, B, of metal or other suitable material, having a web or band of gum-elastic so formed and arranged that, when applied to a jar or other tubular object, the web or band will be stretched, and tending to return to its original form and dimensions will, with the said plate, hermetically seal the jar, as set forth.

In testimony whereof we have signed our names to this specification before two subscribing witnesses.

THOS R. HARTELL.
JOHN LETCHWORTH.

Witnesses:
HENRY HOWSON,
JOHN WHITE.